US006666465B2

(12) United States Patent
Chan

(10) Patent No.: US 6,666,465 B2
(45) Date of Patent: Dec. 23, 2003

(54) GARDEN TROLLEY

(76) Inventor: Alex Chan, 22 El Camino Moraga, Orinda, CA (US) 94563

( * ) Notice: Subject to any disclaimer, the term of this patent is extended or adjusted under 35 U.S.C. 154(b) by 0 days.

(21) Appl. No.: 09/878,952

(22) Filed: Jun. 11, 2001

(65) Prior Publication Data

US 2002/0185831 A1 Dec. 12, 2002

(51) Int. Cl.[7] .............................. B62B 1/00; B62B 7/02; A63B 55/08; A47F 7/02
(52) U.S. Cl. ............................... 280/47.26; 280/47.27; 248/98; 211/70.6
(58) Field of Search ........................... 280/47.26, 47.34, 280/47.35, 47.27, 47.28, 47.24, 47.19; 224/401, 409, 411, 564, 901; 206/349; 248/99, 98, 100; 211/70.6, 71.01, 85.19; D34/26; D12/34, 25

(56) References Cited

U.S. PATENT DOCUMENTS

| | | | | | |
|---|---|---|---|---|---|
| 1,548,986 A | * | 8/1925 | Donovan | ...................... | 248/99 |
| 2,514,849 A | * | 7/1950 | Dewing | ........................ | 280/35 |
| 3,992,034 A | * | 11/1976 | Smith, Sr. et al. | .......... | 280/654 |
| 4,124,185 A | * | 11/1978 | Preisinger | .................... | 248/98 |
| 4,179,132 A | * | 12/1979 | Rich | ........................ | 280/47.26 |
| 4,202,521 A | * | 5/1980 | Harding | ........................ | 248/98 |
| 4,452,468 A | * | 6/1984 | Eads et al. | ................... | 280/641 |
| 4,917,393 A | * | 4/1990 | Rogers | ..................... | 280/47.28 |
| 5,014,944 A | * | 5/1991 | Malik et al. | ................... | 248/99 |
| D335,737 S | * | 5/1993 | Bell, Sr. et al. | ............. | D34/26 |
| 5,213,360 A | * | 5/1993 | Lin | ............................. | 280/648 |
| 5,704,496 A | * | 1/1998 | Latta | ........................ | 211/70.6 |
| 5,947,492 A | * | 9/1999 | Hallberg, Jr. | ............. | 280/47.24 |
| 6,382,642 B1 | * | 5/2002 | Rainey | ..................... | 280/47.24 |

* cited by examiner

Primary Examiner—Brian L. Johnson
Assistant Examiner—G B Klebe

(57) ABSTRACT

A multipurpose light weight easily assembled and disassembled garden trolley featuring two upright tubular frame members the upper portion of which are angled backward to form handles, the lower portions of which are angled forward to form a base and to provide for the attachment at the forward curves of a wheel and axle assembly. The trolley is provided with a removable garden refuse bag supporting assembly unit, laterally fixed by a compression crossbar between the two tubular frame members and a garden basket supporting assembly unit laterally fixed by a compression crossbar between the two tubular frame members above the garden refuse bag supporting assembly unit and provides particular stability to the garden trolley. The trolley is also provided with an array of removable attachment means for garden tools.

6 Claims, 6 Drawing Sheets

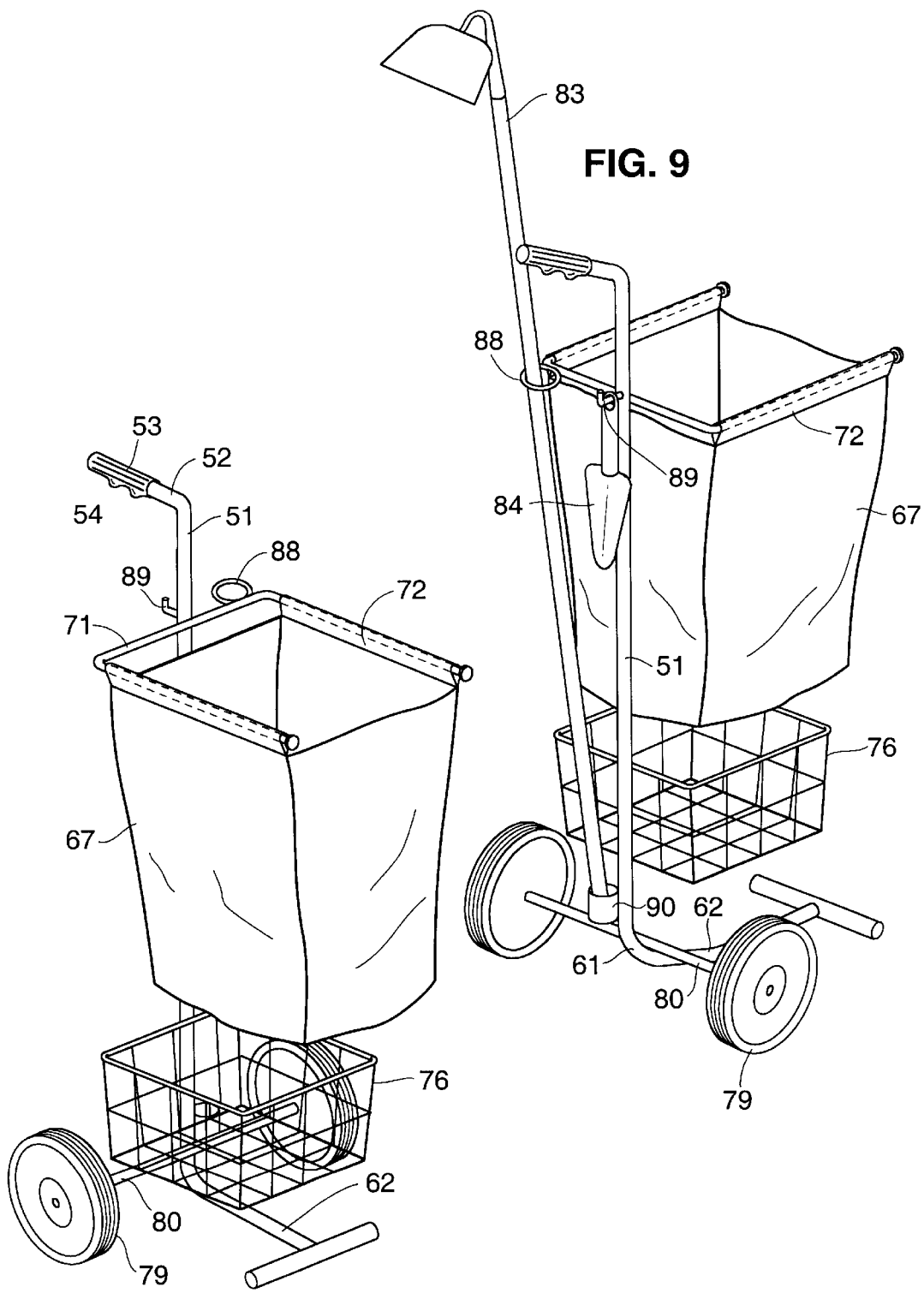

GARDEN TROLLEY

BACKGROUND OF THE INVENTION

Garden trolleys are well known in the prior art and are used to enable gardeners to more easily access garden tools and facilitate collection and removal of garden refuse and soil. However, conventional garden trolleys demonstrate shortcomings, which significantly curb their more widespread acceptance and use. For example, conventional garden trolleys are typically unwieldy particular for the elderly and infirm or semi-infirm. Moreover, many gardeners, particularly in urban areas, have very limited space for storage and there consequently exists the need for a garden trolley which is light weight, easily used and serviced and which can be stored in a minimum of space. Another problem, particularly with the urban gardener, is in shipment of conventional garden trolleys. The cost of shipping these units, because of their weight and bulk, is often inproportionately high and sometimes, as a practical matter, unfeasible. There consequently exists the need for a light weight, easily assembled and disassembled garden trolley which provides all the amenities urban gardeners customarily expect in the larger, heavier and bulkier units conventionally available on the market. The present invention fulfills these and other multiple needs of home gardeners. It provides a lightweight, easily assembled and disassembled unit, which is reasonably priced and readily serviced, yet provides a long and durable lifespan and which also provides all the functions and amenities of the conventional garden trolley. Because of the attachment means for the garden refuse and soil bag and for the garden basket, the present garden trolley provides particular stability in day-to-day use.

SUMMARY OF THE INVENTION

More particularly, the present invention solves the above-stated as well as other needs and resolves the aforesaid shortcomings of conventional garden trolleys by providing a light weight, durable garden trolley which is specifically designed to be easily assembled and disassembled almost entirely without the use of assembly tools. In the preferred embodiments as shown in FIGS. 1 and 2, the basic frame is a U-shaped frame, which can be easily assembled from four basic units and a wheel and axle assembly. In the preferred embodiments two tubular frame members can be easily attached without tools to a single H-shaped intermediate frame member, which provides cross bracing. The H-shaped intermediate tubular frame member telescopes into a lower U-shaped frame member without tools. A wheel and axle unit is easily attached at the bottom of the U-shaped member and a garden refuse bag supporting assembly unit and garden basket supporting assembly unit is readily attached to the frame without tools. In alternative embodiments as shown in FIGS. 8, 9 and 10, one rather than two tubular frame members are utilized and a single H-shaped intermediate frame member is eliminated.

The entire structure is designed for ease of assembly and disassembly for use and shipment. Yet a fully operational garden refuse bag and garden basket as well as hooks and attachment units for garden tools are all provided in easily accessible positions and the unit in assembled form remains stable with heavy use.

In accordance with the foregoing it is an object to the present invention to provide a multifunction garden trolley particularly suitable for residential garden use, which is easily assembled and disassembled for garden use and for shipment.

It is another object of the present invention to provide a garden trolley, which provides all the amenities of conventional garden trolleys while avoiding the problems of weight, bulk and expense typical of the garden trolleys now available on the market.

Another object of the present invention is to provide a garden trolley, which can be manufactured inexpensively and yet is durably constructed for long productive use.

These and other objects of the present invention will become apparent to those skilled in the art after considering the following detailed specification in conjunction with the accompanying drawings, which covers the preferred embodiments of the subject garden trolley.

BRIEF DESCRIPTION OF THE DRAWINGS

FIG. 8 shows an alternative embodiment of the garden trolley according to the invention in front view.

FIG. 9 shows an alternative embodiment of the garden trolley according to the intention in rear view with an array of garden tools in-place.

DETAILED DESCRIPTION OF THE PRESENT INVENTION

Figure 1:
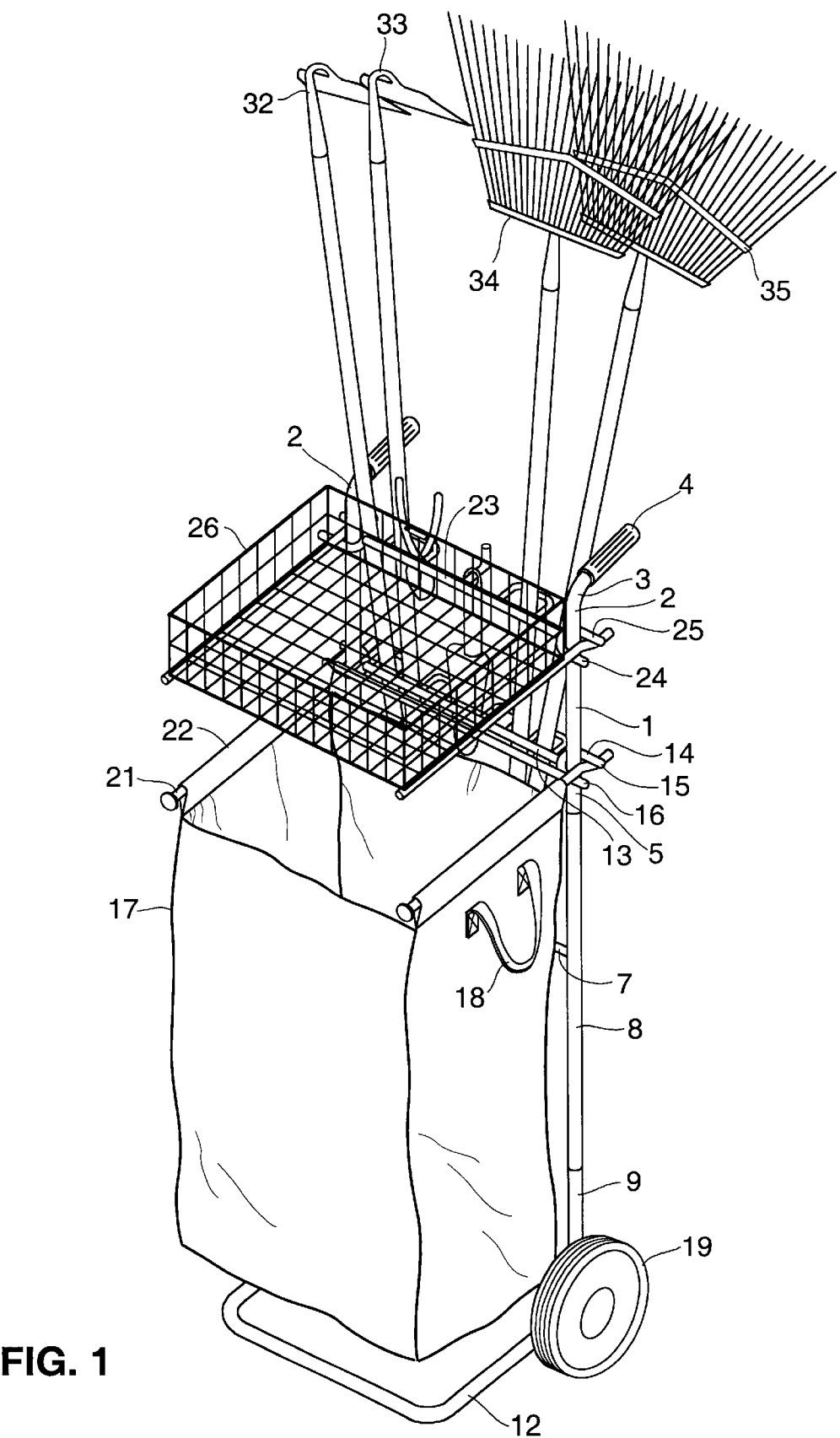
FIG. 1 shows in perspective the preferred embodiment of the garden trolley according to the invention in front view.

Referring to the drawings, more particularly by reference number, FIG. 1 is a front perspective view of the preferred embodiment of the garden cart showing the lightweight and easily assembled and disassembled frame. As shown in FIG. 1 the basic frame is provided with two tubular upper frame members 1, which are angled backward at 2 to form two handles at 3. Alternatively, one tubular upper frame member may be employed constituting a single supporting pole. In this alternative a single handle would be used. Returning to FIG. 1, the handles are provided with handle covers to facilitate gripping by the gardener at 4. Alternatively, the two handles shown at 2 can be connected by a crossbar creating a unitary handle, which can be gripped conveniently by the user. Referring to FIG. 1, The two tubular upper frame members 1 are, at there lower ends 5 telescoped into H-shaped intermediate tubular frame member generally designated 6. Cross bar 7 of the H-shaped intermediate tubular frame member 6 attaches the two legs such as 8 in FIG. 1 of the H-shaped intermediate tubular frame member and serves to stiffen the basic frame. The H-shaped intermediate tubular frame member 6 telescopes into, at the lower end of each leg, the U-shaped tubular frame member designated generally as 9. The lower portion of the U-shaped tubular frame member is curved forward to form a stabilizing base and stand for the garden trolley as shown at 12. Thus a rigid, stable and durable light weight, easily assembled and disassembled garden trolley frame is provided the gardener without compromise in rigidity and concomitant utility.

A refuse and soil bag supporting assembly unit provides easy access to the bag through the shown structure of easily assembled and disassembled elements. The bag supporting assembly unit is provided with a crossbar shown as a tubular crossbar member provided with U-shaped open ends at 13. This tubular crossbar member 13 is secured in-place by compression, the U-shaped ends 14 fitting about and engaging the two tubular upper frame members. The U-shaped open ends have a proximate leg 15 and a distant leg 16 which extend laterally beyond the vertically disposed pair of tubular frame members 1 to provide securing means for the refuse and soil bag 17. The refuse and soil bag is provided with a bag support frame which is shown best in FIG. 3.

Figure 3:
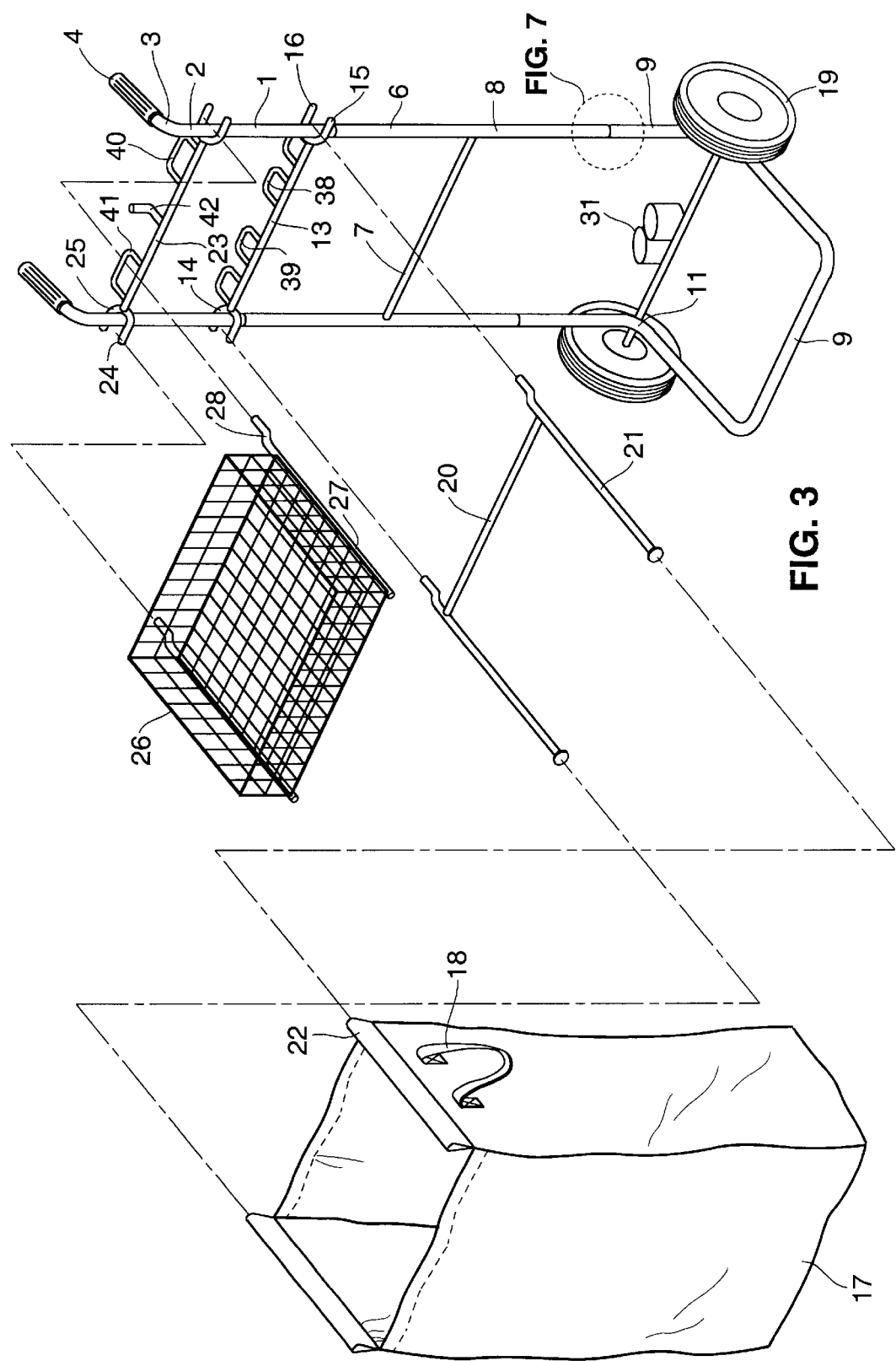
FIG. 3 shows in exploded perspective the preferred embodiment of the garden trolley according to the invention with details of the frame members, garden refuse bag supporting assembly unit and garden basket supporting assembly unit.

As illustrated in FIGS. 1 and 3, the bag support frame is comprised of two parallel bag support rods 21 on which the bag is suspended. In FIG. 1, the refuse and soil bag 17 is provided with sleeves 22 into which the two parallel bag support rods 21 are inserted. However, other means of suspending the bag in a substantially open position are within the scope of the present invention. For example, instead of two parallel bag support rods 21, a supporting ring can be employed as a single bag supporting element.

Referring to FIGS. 1 and 3, the two parallel bag support rods 21 on which the bag 17 is suspended are provided with shaped ends to fixedly secure them to the frame. Each shaped end is fit over the proximate leg end of the corresponding U-shaped open end of the tubular crossbar and under the distant end of the corresponding U-shaped open end of the crossbar as discussed in connection with FIG. 3. As a result the heavier load in the bag the more the two parallel refuse and soil bag support rods are resultantly depressed downward and to the more securely the bag is held in-place in its open position.

The garden basket supporting assembly unit similarly provides easy access to the basket through an analogous structure of easily assembled and disassembled elements. The basket supporting assembly unit is similarly provided with a tubular crossbar member provided with U-shaped open end having proximate legs 24 and distant legs 25. The garden basket 26 is provided with a pair of parallel garden basket attachment rod members 27 which are also shaped at 28 to fit over the proximate open ends leg 24 and under the distant open ends leg 25 of the tubular crossbar member 23 provided with U-shaped open ends. Thus, because of the disposition of these structural elements, downward pressure on the basket 26 fulcrums upward movement by the ends of the parallel garden basket attachment rod members against the distant legs 25 of the U-shaped open ends of the tubular crossbar member 23 thereby preventing failure of the supporting structure for the garden basket. FIG. 1 also shows the easy positioning of long handle garden equipment such as a hoe 31 and a rake 32, shown in further detail in FIG. 2.

In FIG. 1, the garden basket is shown disposed above the bag. However, as an alternative, the garden basket can be disposed below the bag and can be welded or otherwise fixedly secured to the upright frame.

Figure 2:
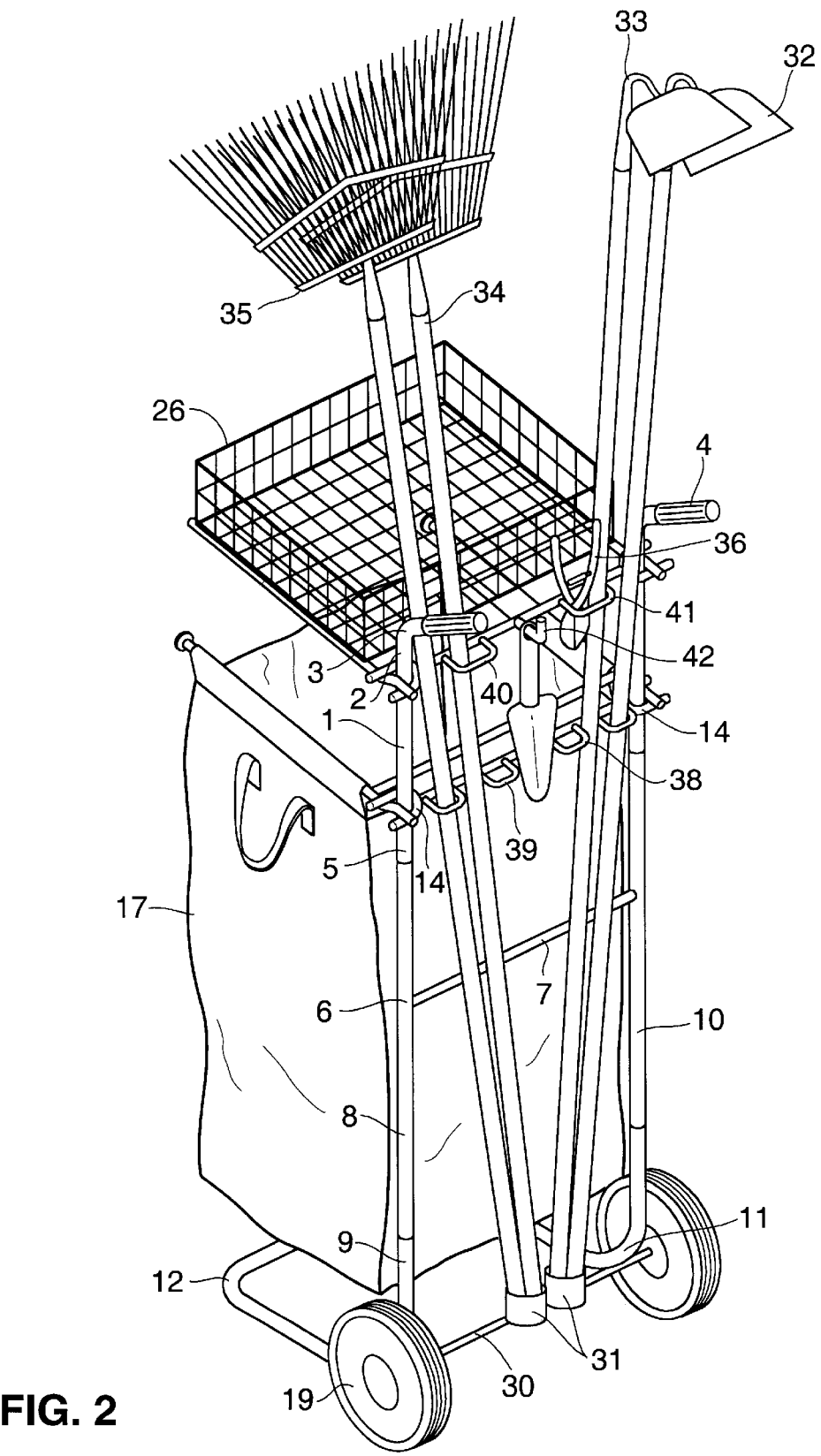
FIG. 2 shows in perspective the preferred embodiment of the garden trolley according to the invention in rear view with an array of garden tools in-place.

The garden trolley depicted in FIG. 2 differs from the garden trolley depicted in FIG. 1 only in the addition of hoes, rakes and the like. Accordingly, identical number designations can be used for the identical parts. FIG. 2 is a rear perspective view of the garden cart showing the manner in which the refuse and soil bag 17 is fixedly secured to the frame, the wire basket 26 is similarly fixedly secured and how the garden tools are conveniently held in-place with tool rings, hooks and receiving cups. The two tubular upper frame members are shown at 1 and angled backward to form handles 3 provided with appropriate grips or handle covers 4. FIG. 2 shows the shaped intermediate tubular frame member 6 with its crossbar 7, which stabilizes the frame. The upper legs of this H-shaped member are fixedly secured to the two tubular upper frame members 1 adapted to provide handles 3 for the gardener. The lower legs 8 and 10 of the each H-shaped intermediate tubular frame member 6 telescope into the U-shaped tubular frame member 9, which is curved at 11 outwardly to form the stabilizing base 12 of the garden cart. The axle 30 to which the two wheels 19 are rotatably connected is attached directly to the U-shaped tubular frame member at the point in which the U-shaped tubular frame member is curved forward to form the base designated 11. Alternatively, the stabilizing base 12 of the garden cart may be provided with a substantially rectangular shaped frame to which the wheel is rotatably connected at each of the four corners.

Referring to the preferred embodiment illustrated in FIG. 2, the axle is provided with two or more receiving cups 31 which are used to hold the top of long handle hoes or rakes such as are shown at 32, 33, 34 and 35. The shape and size of these receiving cups may very considerably without departing from the scope of the invention. They function to simply hold the top of the hoe, rake, and etc. in-place while the garden cart is in use.

The multiple utilization of the tubular crossbar member of the gardener refuse and soil bag designated 13 in FIG. 2 and the multiple utilization of the tubular cross bar member of the garden box supporting assembly unit designated 23 in FIG. 2 further evidence how the subject light weight easily assembled and disassembled garden cart provides all the means expected in bulky, heavier and expensive garden carts. Each of the two tensioned crossbars i.e. tubular crossbar members provided with U-shaped open ends 13 and 23, is equipped with the multiple garden utensil such a shown at 36 held by holding rings 38, 39, 40 and 41 as well as hooks such a shown at 42.

Figure 6:
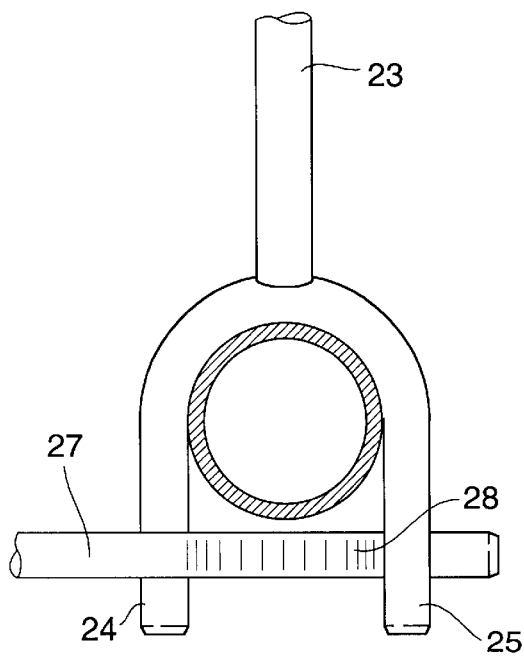
FIG. 6 shows in detail perspective the U-shaped portion of the tubular cross bar member accommodating the tubular frame member in the preferred embodiment.

In FIG. 6 the ends of the crossbar 23 are shown terminating in U-shaped elements accommodating the basket support rods 27 which are U-shaped to fit under the proximate leg of the crossbar at 24 and under the distant leg of the crossbar at 25. However, the crossbar 23 need not have ends which are U-shaped ends. So long as the ends of the crossbar 23 are provided with two separate and distinct substantially parallel ends, which are disposed proximately under and distally over the basket support rod 27, the crossbar 23 fulfills its function within the scope of the present invention.

The means of maintaining the refuse and soil bag in a fixed open position is also shown by the two parallel refuse bag support rods 21 and the transverse bag support rod which joins them 20. Also see the depiction of the shaped end of the transverse bag support rod which fits under the proximate leg and over the distant legs of the tubular crossbar member provided with U-shaped open ends in figure is 3 through 6.

Similarly, the means of maintaining the garden basket in a fixed and secure position is shown in FIG. 2 wherein the two transverse bag support rods which are fixedly secured at the sides of the rigid basket 26 are shaped to fit under the proximate leg 24 and over the distant leg 25 of the corresponding tubular cross bar member 23 provided with these U-shaped open ends or to separate and distinct substantially parallel and is, which are disposed proximately under and distally over the support rod.

The preferred embodiment in the present invention is a wire basket but it should be understood that other baskets might also be used without departing from the scope and spirit of this invention.

FIG. 3, an exploded perspective view from the front of the garden cart most clearly depicts how the elements attaching the refuse and soil bag 17 and the rigid wire garden basket 26 to the frame interconnect. Referring to FIG. 3, the two tubular upper frame members angled back at 2 to form handles 3 are shown interconnected with the intermediate tubular frame member, which telescopes into the U-shaped tubular frame member 9 shaped to form a base 12 and which accommodates the assembled axle 30 and wheels 19. The tubular crossbar member 23 provided with U-shaped open ends for the wire open basket 26 is provided with two tool rings and a tool hook. The similar tubular crossbar member 13 provided with the U-shaped open ends for the garden refuse and soil bag 17 is provided with two tool rings 38 and 39. However, the configuration, positioning and number of tool rings and hooks may very considerably without departing from the scope and spirit of the invention. Each of the two tubular crossbar members 13 and 23 is fixed in position by tensioned exerted by the mouth of each U-shaped open end against the corresponding vertically disposed tubular frame member 1. As shown in FIG. 3, the legs 15 and 16 will that in the structure for supporting the bag 17 and the legs 24 hold that stand 25 hold that in the structure for supporting the garden desk at 26 extend beyond the diameter of the substantially vertically disposed tubular frame member 1 so that they can accommodate the attachment means for the garden refuse and soil bag and for the garden basket. The garden basket 26 is provided with a pair of attachment rod members 27 fixed to the wire basket under each side of the basket. The two garden basket attachment rod members 27 are shaped as shown at 28 to fit over the proximate leg 24 and under the distant leg 25 of the U-shaped open ends of the tubular crossbar member 23 of the garden basket supporting assembly unit. Similarly, the two refuse and soil bag attachment rod members designated as 21 are shaped as shown at 29 to fit over the proximate leg 15 and under the distant leg 16 of the U-shaped open ends of the tubular crossbar member 13 of the garden refuse and soil bag supporting assembly unit. FIGS. 2 and 3 most clearly shows the bag support frame in its entirety. It is comprised of two pair of support rods 21 and the transverse connecting bar 20.

Figure 4:
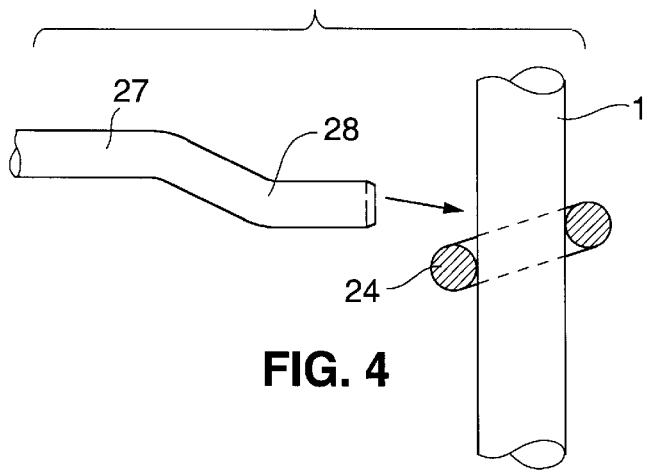
FIG. 4 shows in exploded detail perspective.
Figure 5:
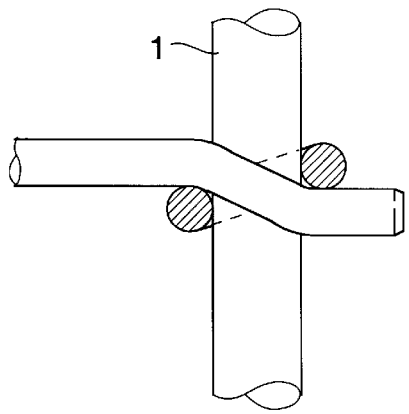
FIG. 5 shows in perspective the garden basket attachment rod member and the tubular crossbar member with U-shaped open ends which fixedly secure the garden basket in position in its preferred embodiment.

FIGS. 4 and 5 show the positioning of one of the two parallel basket support rods 27 and more particularly the shaped end portion thereof 28 and the corresponding tubular upper frame member 1 with the positioning of the proximate leg 24 of the crossbar 23. FIG. 6 shows, in top view, in detail the manner in which the basket support rod 27 with its shaped end portion 28 fits over the proximate leg 24 of crossbar 23 and under distant leg 25 of the crossbar 23 so that the basket 26 is properly supported and, at the same time, the upper tubular frame member 1 is secured in-place with appropriate play. The garden basket attachment rod member 27 is provided with a shaped end portion 28 specifically adapted to fit over the proximate leg of the crossbar 23 and under the distant leg 25 of the crossbar 23. This same effective system is used to secure both the basket and the bag while securing the upper tubular frame members substantially in-place while providing sufficient play for it.

Figure 7:
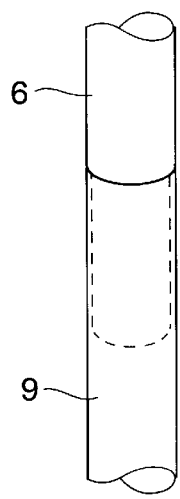
FIG. 7 shows in perspective the intermediate tubular frame member which fits into the lower U-shaped tubular member of the frame.

FIG. 7 shows the telescoping of the H-shaped intermediate tubular frame member 6 into the U-shaped tubular frame member 9. This feature is particularly important in connection with shipment of the garden trolley. The substantially age income in the amount of space required for shipment and concomitantly shipping costs which are an important factor in sales, particularly vis-a-vis urban gardeners.

FIG. 8 is a front perspective view of the alternative embodiment of the garden cart showing the lightweight and easily assembled and disassembled simplified frame. As shown in FIG. 8 the basic frame is provided with a single tubular frame member 51, which is angled backward at 52 to form a handle at 53. Referring to FIG. 8, the tubular frame member 51 is curved forward to form a stabilizing base in standard for the garden trolley as shown at 62. Thus a rigid, stable and durable light weight, easily assembled and disassembled garden trolley frame is provided.

A refuse and soil bag supporting assembly unit provides easy access to the bag through the shown structure of easily assembled and disassembled elements. The bag-supporting unit can be provided with a crossbar shown as a tubular crossbar member provided with a U-shaped open end at 13 in FIG. 1. This tubular crossbar member 13 in FIG. 1 is secured in-place by compression, the U-shaped ends 14 fitting about and engaging the two tubular upper frame members as previously described. Alternatively, as shown in FIGS. 8 and 9 the refuse bag 67 can be suspended and supported by rod member 71 by means of sleeves 72 from the single tubular frame member 51. However, other means of supporting and suspending the bag in a substantially open position are within the scope of the present invention. For example, a supporting ring can be employed as a single bag-supporting element.

The garden basket supporting means similarly provides easy access to the basket. The basket supporting assembly unit can similarly be provided with a tubular crossbar member provided with a U-shaped open end having proximate legs 24 and distant legs 25 as shown in FIGS. 1 through 3. Alternatively, as shown in FIGS. 8 through 10, the garden basket can be fixedly secured to the frame member 51.

In FIG. 1, the garden basket is shown disposed above the bag. However, as an alternative as shown in FIGS. 8 through 10, the garden basket 76 can be disposed below the bag 67 and can be welded or otherwise fixedly secured to the upright frame.

The garden trolley depicted in FIG. 9 is identical to the garden trolley depicted in FIG. 8 except that a hoe 83 and garden tool 84 have been added. Accordingly, identical number designations can be used for the identical parts. FIG. 9 is a rear perspective view of the garden cart showing the manner in which the refuse and soil bag 67 is fixedly secured to the frame, the wire basket 76 is similarly fixedly secured and how the garden tools 83 and 84 are conveniently held in-place with tool ring 88, hook 89 and receiving cup 90. The axle 80 to which the two wheels 79 are rotatably connected is attached directly to the tubular frame member 51 at the point at which the tubular frame member 51 is curved forward to form the base at 61. Alternatively, the stabilizing base 62 of the garden cart may be provided with a substantially rectangular shaped frame to which the wheels are rotatably connected at each corner.

Figure 10:
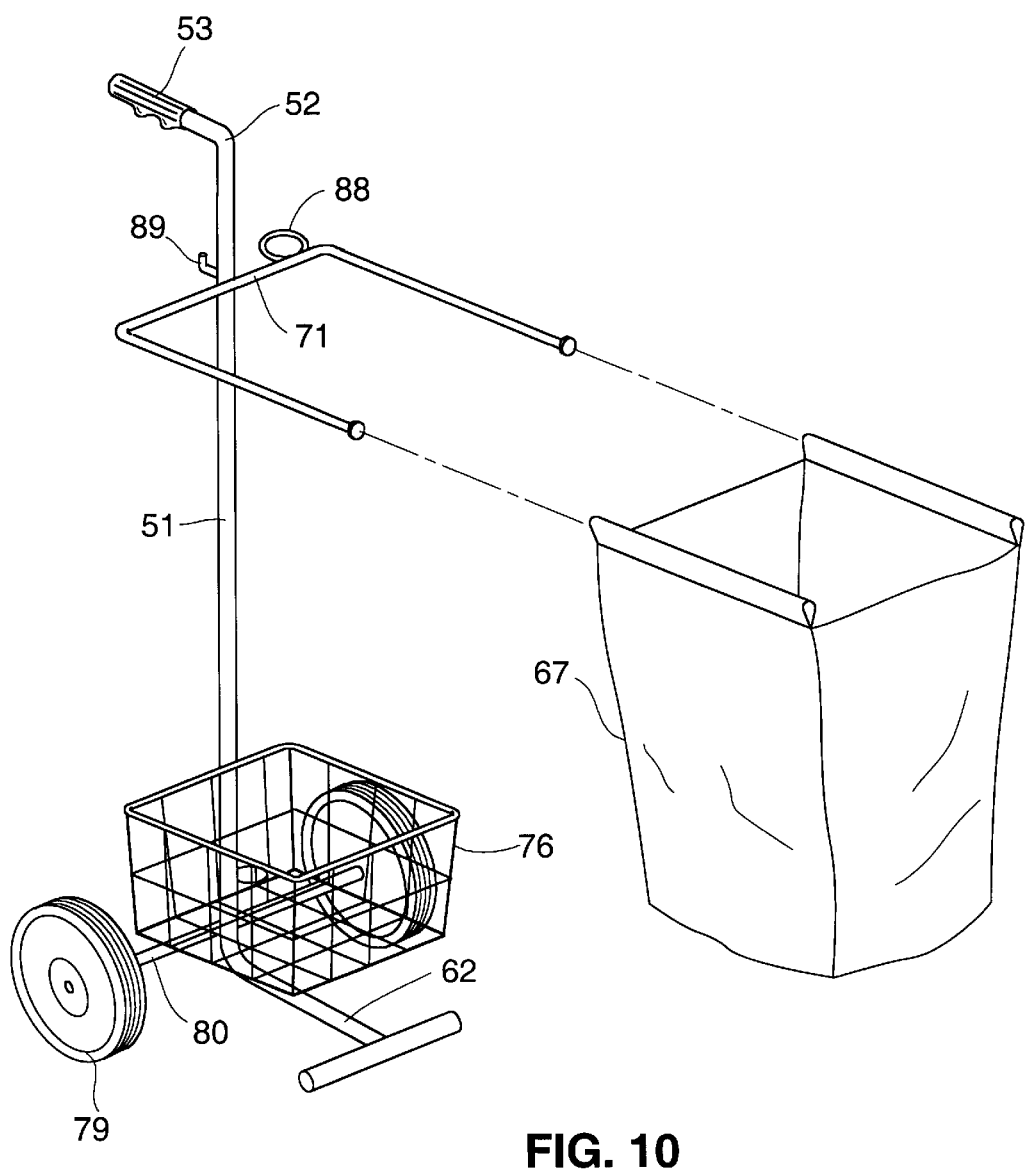
FIG. 10 shows in exploded perspective an alternative embodiment of garden trolley according to the invention with details of the frame member, garden refuse bag and support and garden basket and support.

FIG. 10, an exploded perspective view from the front of the garden cart, most clearly depicts how the elements attaching the refuse and soil bag 67 and the rigid wire garden basket 76 to the frame interconnect in this subject alternative embodiment. Referring to FIG. 10, the tubular frame member 51 angled back at 52 to form handles 53 are shown shaped to form a base 62, which accommodates the assembled axle 80 and wheels 79. The garden refuse and soil bag 67 is provided with tool rings. However, the configuration, positioning and number of tool rings and hooks may vary considerably without departing from the scope and spirit of the present invention.

Thus, applicant has shown and described a novel multiuse garden wagon, which fulfills all of the objects and advantages described. Additional changes, alterations, modifications and alternate uses and applications of the subject multipurpose easily assembled and disassembled light and durable garden wagon will become apparent to those skilled in the art after considering the present specification and accompanying drawings. All changes, modifications, variations and other uses and applications which do not part from the spirit and scope of the invention are deemed to be covered by the invention which is limited only by the claims as follows:

What is claimed is:

1. A garden trolley comprising:

at least one upright tubular frame member;

at least one handle fixedly secured to and extending backwards from said upright tubular frame member at the upper end thereof;

a base fixedly secured to and extending forwards from said upright tubular frame member at the lower end thereof to form supporting means for the garden trolley;

a wheel and axle assembly operatively secured to said base comprising at least one axle and two wheels operatively secured thereto;

a garden refuse bag supporting assembly unit laterally secured to the upright tubular frame member, said garden refuse bag supporting assembly unit comprising a tubular crossbar member provided with two U-shaped ends, a garden refuse bag, a refuse bag attachment means secured to and holding open said bag at one end and at the other end attached to the ends of the tubular crossbar member; and a garden basket laterally secured to the upright tubular frame.

2. The garden trolley as set forth in claim 1, wherein the tubular crossbar member of the garden refuse bag supporting assembly unit is provided with holding rings to accommodate garden tools.

3. A garden trolley comprising:

two upright tubular frame members, the upper portions of which are angled backward to form handles and the lower portions of which are attached to an H-shaped intermediate tubular frame member which is telescoped into a lower U-shaped tubular frame member, the lower portion of which is angled forward to form a base for supporting the garden trolley on the ground, a wheel and axle assembly operatively secured at the forward angled portion of the lower U-shaped tubular frame member;

a garden refuse bag supporting assembly unit laterally secured between the two upright tubular frame members, said garden refuse bag supporting assembly unit comprising a tubular crossbar member provided with U-shaped open ends which lock by compression with and urge apart the two tubular frame members, a garden refuse bag, a pair of refuse bag attachment rod members each secured at one end at the mouth of said bag on each side thereof and at the other end attached to the U-shaped ends of the tubular crossbar member; and a garden basket supporting assembly unit laterally secured between the two tubular frame members and disposed above the garden refuse bag supporting assembly unit comprising a tubular crossbar member provided with U-shaped open ends which lock by compression with and urge apart the two upright tubular frame members, a garden basket, a pair of garden basket attachment rod members each secured on each side of said basket and at the other end attached to the U-shaped ends of the tubular crossbar member.

4. The garden trolley as set forth in claim 3, wherein the tubular crossbar member of the garden refuse bag supporting assembly unit is provided with holding rings to accommodate garden tools.

5. The garden trolley as set forth in claim 3, wherein the garden refuse bag attachment rod members are shaped to fit the U-shaped ends of the tubular crossbar members of the garden refuse bag supporting assembly unit.

6. The garden trolley is set forth in claim 3, wherein the basket attachment rod members are shaped to fit the U-shaped ends of the tubular crossbar members of the basket supporting assembly unit.

* * * * *